United States Patent [19]

Cage et al.

[11] Patent Number: 4,738,143
[45] Date of Patent: Apr. 19, 1988

[54] HIGH TEMPERATURE CORIOLIS MASS FLOW RATE METER

[75] Inventors: Donald Cage; Michael J. Zolock, both of Longmont, Colo.

[73] Assignee: Micro Motion, Incorporated, Boulder, Colo.

[21] Appl. No.: 770,573

[22] Filed: Aug. 29, 1985

[51] Int. Cl.[4] ............................................. G01F 1/84
[52] U.S. Cl. ................................................. 73/861.38
[58] Field of Search ...................... 73/861.37, 861.38; 339/9 E; 174/86

[56] References Cited

U.S. PATENT DOCUMENTS

| Re. 31,450 | 12/1983 | Smith | 73/861.38 |
|---|---|---|---|
| 1,292,716 | 1/1919 | Cox . | |
| 2,897,254 | 7/1959 | Dickinson | 339/9 |
| 3,027,757 | 4/1962 | Achter et al. . | |
| 3,218,851 | 11/1965 | Sipin | 73/861.37 |
| 3,339,400 | 9/1967 | Banks | 73/32 |
| 3,345,881 | 10/1967 | Nicolau et al. . | |
| 3,374,662 | 3/1968 | Achter et al. . | |
| 3,385,104 | 5/1968 | Banks . | |
| 3,555,880 | 1/1971 | Menius et al. | 73/32 |
| 3,583,209 | 6/1971 | Banks | 73/32 |
| 3,584,508 | 6/1971 | Shiba . | |
| 3,589,167 | 6/1971 | Hill | 374/56 |
| 3,757,808 | 9/1973 | Peterson et al. | 137/2 |
| 3,818,122 | 6/1974 | Luetzow | 339/8 X |
| 3,913,384 | 10/1975 | Furuya et al. | 73/53 |
| 3,927,565 | 12/1975 | Pavlin et al. | 73/861.38 X |
| 3,980,369 | 9/1976 | Panek . | |
| 4,021,795 | 5/1977 | Hollingsworth | 340/272 |
| 4,063,448 | 12/1977 | Agar | 73/32 A |
| 4,187,721 | 2/1980 | Smith | 73/861.38 |
| 4,345,804 | 8/1982 | Lanoue | 339/9 |
| 4,404,858 | 9/1983 | Blechinger | 73/861.02 |
| 4,422,338 | 12/1983 | Smith | 73/861.38 |
| 4,441,073 | 4/1984 | Davis | 324/52 |
| 4,491,025 | 1/1985 | Smith et al. | 73/861.38 |

Primary Examiner—Herbert Goldstein

[57] ABSTRACT

A Coriolis mass flow meter apparatus, suitable for high temperature applications, wherein a preferred embodiment of the apparatus is comprised of two cantilever-mounted U-shaped flow tubes sinusoidally driven as the times of a tuning fork by a drive mechanism mounted on standoff means attached to the flow conduits, with flow rates measured by velocity sensors mounted on suspension bars attached to the flow conduits. The flow conduits are encased in an inner thermal isolation partition wall structure containing apertures through which the suspension bars and standoff means protrude. A vented outer casing encloses the flow tube and partition wall structure, with insulation provided between the outer casing and the partition wall. Thermal control means are provided inside the space enclosed by the partition wall means. Gas cooling means are provided for the velocity sensors and drive mechanism. Flexible double wire structure means are provided to transmit the velocity sensor signals.

7 Claims, 4 Drawing Sheets

HIGH TEMPERATURE CORIOLIS MASS FLOW RATE METER

BACKGROUND OF THE INVENTION

In the art of measuring mass flow rates of flowing substances it is known that flowing a fluid through a rotating or oscillating conduit induces Coriolis forces which act perpendicularly to both the velocity of the mass moving through the conduit and the angular velocity vector of the rotating or oscillating conduit. It is also known that the magnitudes of such Coriolis forces are related to both the mass flow rate passing through the conduit and the angular velocity of the conduit.

One of the major technical problems previously associated with efforts to design and make Coriolis mass flow rate instruments was the necessity either to measure accurately or control precisely the angular velocity of the conduit so that the magnitude of generated Coriolis forces could be determined and, therefrom, one could calculate the mass flow rate of the substance flowing through the conduit. Even if the angular velocity of the flow conduit could be determined or controlled, accurate determination of the magnitude of generated Coriolis forces was another technical problem previously associated with designing and making Coriolis mass flow rate instruments. This problem arises in part because the magnitude of generated Coriolis forces are very small, therefore resulting distortions of flow conduits which are oscillating or rotating are minute. Further, because of the small magnitude of the Coriolis forces, distortions of the conduit resulting from external sources such as invariably present vibrations induced, for example, by neighboring machinery or pressure surges in fluid lines cause erroneous determinations of mass flow rates. Such error sources may even completely mask the effects caused by generated Coriolis forces rendering the meter useless.

A mechanical configuration and measurement technique which, among other advantages: (a) avoids the need to measure or control the magnitude of the angular velocity of a Coriolis mass flow rate instrument's flow sensing conduit; (b) concurrently provides requisite sensitivity and accuracy for the measurement of effects caused by generated Coriolis forces; and, (c) is not susceptible to errors resulting from external vibration sources, is taught in U.S. Pat. Nos. Re. 31,450, 4,422,338 and 4,491,025. The mechanical configuration disclosed in these patents incorporates curved flow sensing conduits which have no pressure sensitive sections, such as bellows or other pressure deformable portions. The curved flow sensing conduits are solidly cantilever mounted from the inlet and outlet ports of the conduits, e.g. welded or brazed, so that the conduits can be oscillated in springlike fashion about axes which are located near the solidly mounted sections of the conduits. By further designing the mounted curved flow conduits so that they have resonant frequencies about the axes located near the solid mountings which are lower than the resonant frequencies about the axes which Coriolis forces act, a mechanical situation arises whereby the forces opposing generated Coriolis forces are predominantly linear spring forces. Oscillation of such a solidly mounted curved flow conduit while fluid is flowing through the flow conduit results in the generation of a Coriolis force couple. This Coriolis force couple is generated in two portions of the continuous flow conduit, to wit the portion where there is a velocity component of the fluid through the conduit directed toward the angular velocity vector, and the portion where there is a fluid velocity component directed away from the angular velocity vector. The Coriolis force couple opposed by linear spring forces twists or torques the curved conduit about an axis between the portions of the continuous flow conduit in which Coriolis forces are generated. The magnitude of the twisting or torquing is a function of the magnitudes of the generated Coriolis forces and the linear spring forces opposing the generated Coriolis forces.

The flow conduit in addition to being twisted by Coriolis forces is also being driven in oscillation. Accordingly, one of the portions of the continuous flow conduit on which the Coriolis forces are acting will be twisted so as to lead, in the direction in which the flow conduit is moving, and the other portion on which Coriolis forces are acting will be twisted so as to follow the first flow conduit section. The amount of time required for the respective twisted sections of the oscillating flow conduit to pass preselected points is a linear function of the mass flow rate of the fluid passing through the flow conduit. The relationship between the measured time and the mass flow rate passing through the flow conduit is only dependent on constants derived from the mechanics of the continuous flow conduit and its solid mounting. This relationship is not dependent on other variables which must be measured or controlled. Optical sensors are specifically described in U.S. Pat. No. Re. 31,450 and electromagnetic velocity sensors are specifically described in U.S. Pat. Nos. 4,422,338 and 4,491,025 for making the required time measurements from which mass flow rates can be determined.

A double flow conduit embodiment with sensors for making the necessary time measurements is specifically described in U.S. Pat. No. 4,491,025. The double flow conduit embodiment described in U.S. Pat. No. 4,491,025 provides a Coriolis mass flow rate instrument configuration which is operated in a tuning fork manner as described in U.S. Pat. No. Re. 31,450. The tuning fork operation contributes to minimizing effects of external vibration forces. Minimizing effects of external vibration forces is important because these forces can induce errors in the required time measurement. This embodiment also provides for accurate determinations of fluid mass flow rates without being limited by vibrational forces which can be transmitted through the support where the flow conduits are solidly mounted. The vibrational forces transmitted through the support which are of concern here are those caused by the oscillation of the flow conduits. As the mass of flow conduits increase, the forces transferred to the support by oscillating the conduits similarly increase. Because the flow conduits are configured in, and oscillated in, a tuning fork arrangement, the forces arising in the support are of equal magnitude. The forces are directed predominantly against each other and therefore cancel. As taught in U.S. Pat. No. Re. 31,450, it is possible to build single flow conduit Coriolis mass flow rate instruments without counterbalancing oscillating structures. Such single flow conduit Coriolis mass flow rate instruments, however, require supports which are massive in relation to the oscillated conduit so as not to be affected by the forces produced in association with oscillating the conduit. As a practical matter, in most industrial environments, instruments with flow conduits having inside diameters greater than about 1/16th inch are best constructed with tuning fork arrangements.

The support for an instrument can include multiple structures as taught in U.S. Pat. No. 4,491,025. In addition to welding or brazing the flow conduits to a first support structure, spacer bars, such as metal plates, can also be welded or brazed to adjacent portions of twin flow conduit embodiments at essentially equal distances from the first support structure. The combination of welding or brazing the flow conduits to the first support structure and to spacer bars results in an increase in the length of the flow conduit over which stress caused by oscillating the conduit is concentrated. This effective increase in the length of flow conduit decreases the strain experienced by the flow conduit and therefore provides a configuration which is less likely to produce cracks in oscillating flow conduits. The use of spacer bars also results in movement away from the first support structure of the axis about which the flow conduits are oscillated.

SUMMARY OF THE INVENTION

Due to the structural and pressure requirements for Coriolis mass flow rate meter flow conduits, and also the magnitudes of generated Coriolis forces, which are small in spite of even large mass flow rates and high angular velocities, the resulting twisting or torquing distortions of flow conduits are extremely small. These small flow conduit distortions also cause time measurements, which must be made to determine mass flow rates, to be very short, e.g. measurements can be as small as $4 \times 10^{-8}$ seconds. In order to accurately measure such small time periods resulting from minute Coriolis force caused distortions of an oscillating flow conduit, sensors which are capable of making true linear, highly repeatable measurements are required. Magnetic velocity sensors designed in accordance with U.S. Pat. No. 4,422,338 can be used to make the necessary time measurements. These magnetic velocity sensors provide outputs from wire coils which are a linear function of the relative velocity of the wire coils with respect to the magnets of the velocity sensors. A physical requirement for these magnetic velocity sensors is the maintenance of the positions of the wire coils of the velocity sensors within the essentially uniform portion of the magnetic fields of the velocity sensor magnets. The wire coil and magnet of the velocity sensors therefore must be positioned in close spacing with respect to each other in spite of the mandatory concurrent requirement for having the wire coil and magnet positioned so that they can be moved with respect to each other. Additionally, the signal generated by the wire coil must not be degraded by shorts in the wire coil. Therefore, the electrical insulation on the wire used to form the coils must be maintained to prevent shorts. These requirements can be compromised when the fluid passing through the flow conduit on which velocity sensors are mounted, heats the conduit to temperatures higher than 400° F. and the velocity sensors are then subjected to such high temperature environments. In particular the temperature ratings for most electrically insulated wire are exceeded at 400° F. temperatures unless special wire such as aluminum oxide or ceramic insulated nickel clad copper is used. Use of such wire, however, presents substantial difficulties in the fabrication of coils. These difficulties present an absolute limitation for many important commercial applications such as measurement of the mass flow rate of asphalt, liquid sulfur and high density crude oil which must be maintained at high temperatures in order to pump them through a pipeline. These and other important high temperature commercial applications can cause the wire insulation on velocity sensor coils to degrade and produce electrical shorts. The resulting shorts in coils produce eddy currents that dampen the motion of the conduit to which the coils are attached and thereby cause errors in determining mass flow rates. Resort to use of wire having high temperature rated insulation however does not overcome the problems because handling these wires requires very special attention. Aluminum oxide or ceramic insulation will invariably be abraded, scraped or pulled away from the wire by normal handling. Further when using ceramic insulated wire, curing is required to bond the windings so that vibrations of the coil do not abrade the insulation and cause shorts. However, controlling the curing process is difficult because of its unpredictability. Improper curing can cause shorts between windings if too much heat is used in curing, or if too little heat is used and the windings are not properly bonded vibrations can abrade the insulation.

In commercial embodiments built in accordance with U.S. Pat. Nos. 4,422,338 and 4,491,025 the signals from the velocity sensor coils were transmitted away from the oscillating flow conduits by wires which were wrapped around the flow conduits. This arrangement as opposed to stretching wires from fixed points to the velocity sensor coils minimizes forces from the wires interfering with the oscillation of the flow conduits. Minimizing forces other than Coriolis forces from acting on flow conduits is critical if accurate mass flow rate measurements are to be made. For example, even when wires are wrapped around and down flow conduits, some finite amount of damping forces, which can not be measured or eliminated, are generated at different magnitudes along the lengths of the conduit where the wires are wrapped.

In the present invention the adverse thermal effects on Coriolis mass flow rate instruments caused by high temperature fluids passing through the instruments are addressed by a configuration which neither requires special high temperature rated insulated wire nor has reduced sensitivity or accuracy. The preferred embodiment of the present invention involves a double flow conduit configuration with a partition wall positioned between the flow conduits and the velocity sensors to minimize thermal flow from the flow conduits to the velocity sensor components. Suspension bars are affixed to each of the flow conduits for mounting the wire coils and magnets of the velocity sensors on the other side of the partition wall from the flow conduits. The suspension bars and velocity sensor components are arranged with respect to each other so that the wire coils are maintained in the uniform portion of the magnetic fields of the velocity sensor magnets during operation of the instrument. The partition wall has adequate openings about the suspension bars for the velocity sensor coils and magnets to permit unfettered oscillation of the flow conduits. Further enclosing the instrument is a second outer case. Between the second outer case and the inner partition wall is a layer of insulating material to increase the thermal insulation provided by the partition wall and to thereby further decrease thermal flow from the flow conduits.

In addition to the lowered temperature at the locations of the velocity sensors resulting from the combination of the suspension bars spacing the velocity sensors away from the flow conduits, the partition wall, and the insulation between the partition wall and the outer second case, there are tubes installed between the partition wall and the second outer case to supply compressed cooling gas, such as nitrogen or air, for flow over the velocity sensors. The second outer case is vented to provide for discharge of the used cooling gas.

To transmit the signals from the velocity sensor coils, the present invention uses a double wire structure for each coil. The wires of the double wire structure are mounted so as to be connected to the velocity sensor coil outputs at one end and to be connected to wires at the other end which are used to transmit signals from the meter. The wires of the double wire structure, which are single strand uninsulated wires, are configured in a loop, semi-circular or other non-rectilinear shape so as to minimize the probability of the wires being kinked during movement of one end of the wires or of coupling damping or drag forces to the velocity sensors. The minimization of coupling damping or drag forces to the velocity sensor coils results not only from the flexibility of the single strand uninsulated wire used for the double wire structure, but also and most importantly from the fact that the wires are arranged non-rectilinearly so that when the coils are moved deflection of the wires is minimized. The double wire structure of the present invention is not limited in its use to only flow meters, but can be used in any electrical system where signals must be transmitted from a first structure moving with respect to a second structure and damping or drag forces must be minimized.

BRIEF DESCRIPTION OF THE DRAWINGS

In the drawings.

Corresponding components are designated by the same reference numerals throughout the various figures.

DETAILED DESCRIPTION OF THE INVENTION

Figure 1:
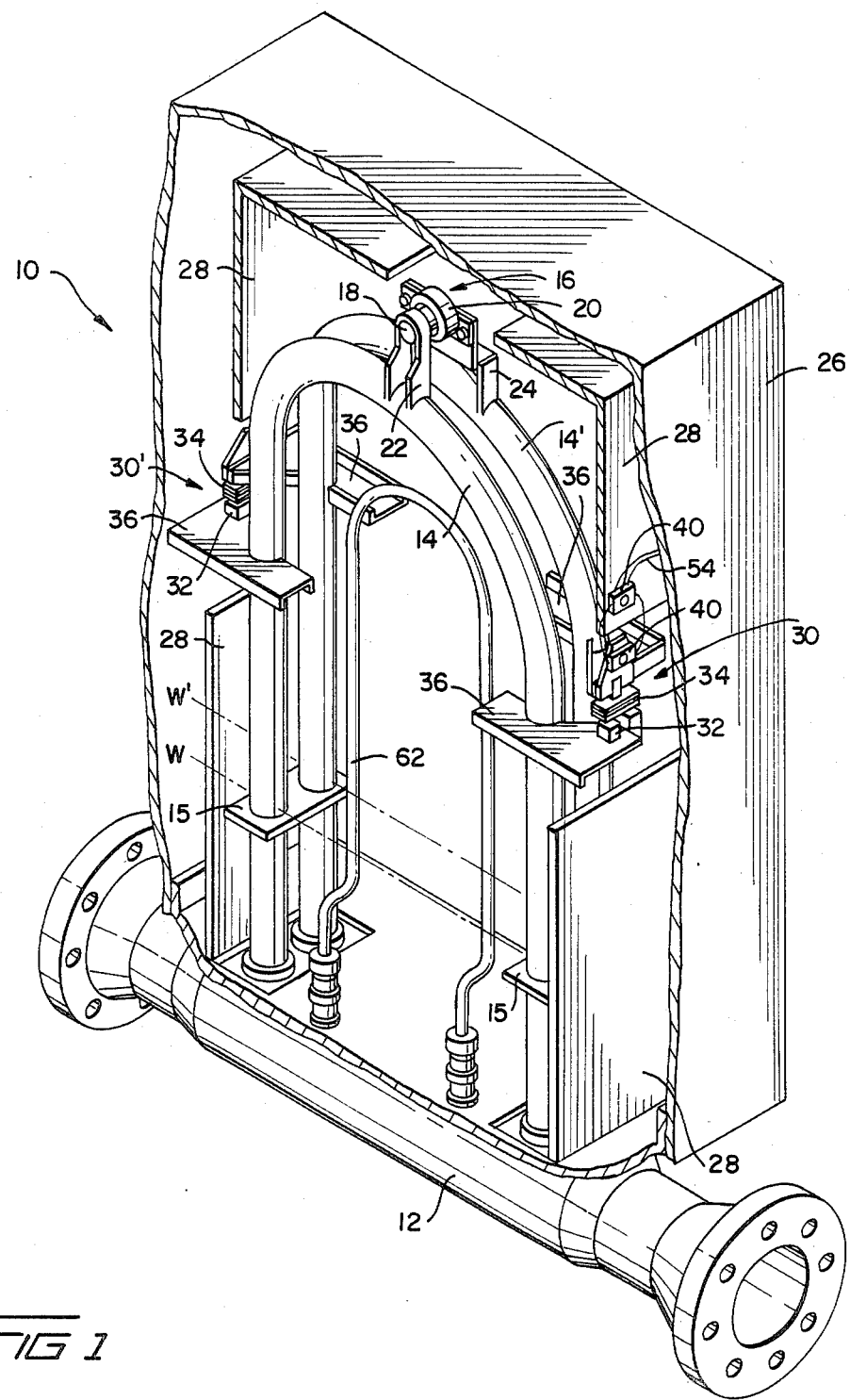
FIG. 1 is a perspective view of a high temperature Coriolis mass flow rate meter with the surrounding case partially cut away to show the mounting of a velocity sensor according to the present invention.

Referring now to the drawings, a high temperature Coriolis mass flow rate meter according to the present invention is illustrated in FIG. 1 and generally designated by reference numeral 10. Measuring device 10 includes support pipe 12 from which two curved flow conduits 14 and 14' are solidly (e.g. welded or brazed) cantilever mounted in substantially parallel fashion. Both support pipe 12 and flow conduits 14 and 14' are fabricated from high temperature resistant materials such as 316L, 317, 317L, 347, 254SMO or 904 stainless steel or C276 (a high temperature alloy) sold under the trademark HASTELLOY. The two flow conduits 14 and 14' are fabricated from continuous tubing and are free of pressure deformable sections. Solidly attached, e.g. welded or brazed, to both flow conduits 14 and 14' are spacer bars 15 which in combination with support pipe 12 provide a cantilever mounting for flow conduits 14 and 14'. The flow conduits 14 and 14' are selected and mounted so as to have substantially the same moments of inertia and the same spring constants about axes, W—W and W'—W', which are adjacent spacer bars 15. Since flow conduits 14 and 14' are solidly cantilever mounted at their open ends in an essentially parallel fashion and have substantially equal moments of inertia and equal spring constants about their respective axes, W—W and W'—W', adjacent spacer bars 15, the flow conduits are driven in opposite phase about these axes W—W and W'—W' at essentially the same resonant frequency so as to function as the tines of a tuning fork. The driving forces are applied to flow conduits 14 and 14' in the preferred embodiment by drive mechanism 16. Drive mechanism 16 consists of such known means as a magnet 18 and a coil 20 through which an oscillating electrical current is passed so that the flow conduits 14 and 14' are driven at their common resonant frequency, whereby the flow conduits 14 and 14' do operate as the two tines of a tuning fork. Drive mechanism 16 is separated from the flow conduits 14 and 14' by standoffs 22 and 24 which respectively rigidly attach the magnet 18 and the coil 20 of the drive mechanism 16 to the flow conduits 14 and 14'.

Affixed to support pipe 12 is an outer case 26 which can be fabricated of sheet metal. Positioned within outer case 26 but between the outer case 26 and the flow conduits 14 and 14' is a partition wall 28, which can also be fabricated from sheet metal. Partition wall 28 is cut out with an opening for standoffs 22 and 24 so that the magnet 18 and coil 20 of drive mechanism 16 can be positioned between the outer case 26 and the partition wall 28. Openings are also provided in partition wall 28 so that the velocity sensors 30 and 30' which are affixed to flow conduits 14 and 14' can be positioned between the partition wall 28 and the outer case 26. To position the velocity sensors 30 and 30' between the partition wall 28 and the outer case 26 the magnets, 32 and 32', and the coils, 34 and 34', of velocity sensors 30 and 30' are affixed to the flow conduits 14 and 14' by suspension bars 36. The suspension bars 36 with their attached magnets, 32 and 32', or coils, 34 and 34', can be brazed or welded to flow conduits 14 and 14' in such a configuration that the center of gravity for each suspension bar 36 is located essentially at the position of the respective flow conduit 14 and 14' where the suspension bar 36 is attached to the flow conduit. This geometry for the suspension bars 36 minimizes the mechanical effects caused by the extension of the velocity sensor components from the flow conduits 14 and 14' which would otherwise substantially mismatch the dynamic characteristics of the two flow conduits 14 and 14'. If the dynamic characteristics of flow conduits 14 and 14' are mismatched they can not effectively be driven in oscillation as the tines of a tuning fork. Further, the suspension bars 36 and the magnets, 32 and 32', and the coils, 34 and 34', are configured so that each velocity sensor, 30 and 30', consists of a coil, 34 or 34', maintained in a uniform magnetic field throughout the oscillation and Coriolis force induced distortion of the flow conduits 14 and 14'. Maintaining the coils 34 and 34' in uniform magnetic fields provides linear signals from each coil, 34 and 34', which are representative of the relative velocities between the coils, 34 and 34', and the respective magnets, 32 and 32'.

Instead of using two suspension bars 36 for each flow conduit, 14 and 14', a single suspension bar could be used for each flow conduit 14 and 14' as is described in copending concurrently filed application Ser. No. 770,590, with the magnets 32 and 32' attached to one suspension bar and the coils 34 and 34' attached to the other suspension bar.

Figure 4:
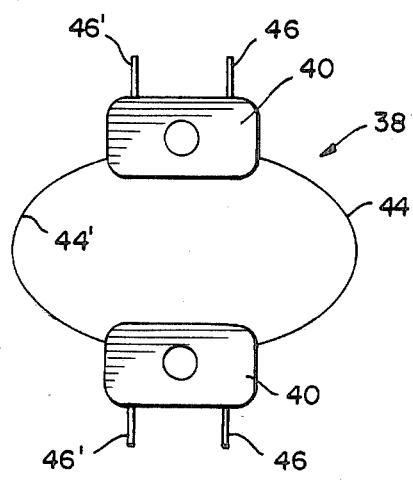
FIG. 4 is a front plan view of a flexible double wire structure according to the present invention.
Figure 5:
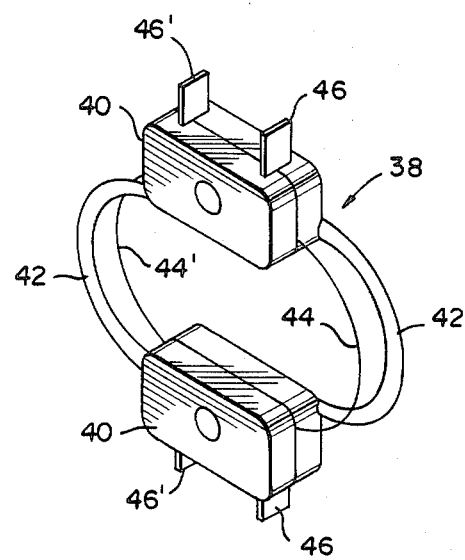
FIG. 5 is a perspective view of a flexible double wire structure before the protective bridges have been removed.

Transmission of the electrical signals from each coil, 34 or 34', is accomplished by use of a flexible double wire structure 38 which is shown in FIGS. 4 and 5. As shown in FIG. 5 the flexible double wire structure 38 includes two mounting stubs 40, two protective bridges 42 and two flexible wires 44 and 44'. Each of the flexible wires, 44 and 44', are electrically connected at each end to respective tabs 46 and 46'. Uninsulated single strand light gauge wire, such as 36 gauge nickel plated alloy 135 wire, is used for the semi-circular shaped flexible wires 44 and 44'.

Figure 6:
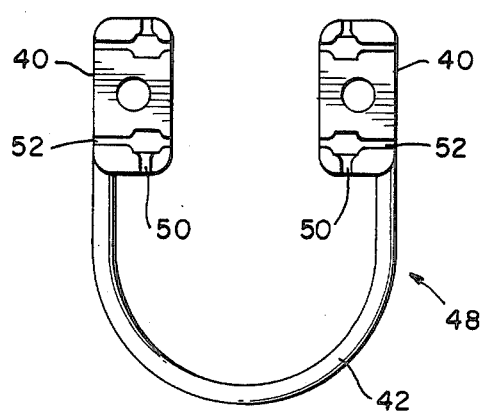
FIG. 6 is a front plan view of a half section for a flexible double wire structure as shown in FIG. 5.
Figure 7:
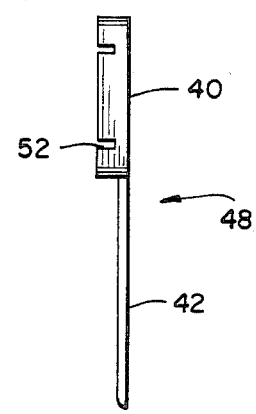
FIG. 7 is a side plan view of a half section for a flexible double wire structure as shown in FIG. 5.

To assemble the flexible double wire structure 38 two plastic half sections 48 (see FIGS. 6 and 7), which, for example, can be fabricated by injection moulding, are assembled so that the protective bridges 42, which can be any shape, are on opposite sides of stubs 40 as shown in FIG. 5. Prior to assembling the flexible double wire structure 38, a semi-circular shaped flexible wire 44 or 44' which is approximately in the shape of protective bridge 42 is positioned with its ends in the slots 50 adjacent the protective bridge of the half section 48. The tabs 46 or 46' are positioned in the slots 52 which are perpendicular to the slots 50 adjacent the protective bridge 42. When a wire 44 or 44' and the associated tabs 46 or 46' are positioned in the half sections 48 the ends of the wire 44 or 44' are soldered to both tabs 46 or 46'. After two half sections 48 are configured with wires 44 and 44' and tabs 46 and 46' the two half sections 48 are assembled with the protective bridges 42 and wires 44 and 44' being in opposing positions and the half sections 48 are affixed together by gluing, ultrasonically welding or solvent bonding as a double wire structure 38. This structure provides a convenient and sturdy unit, with the protective bridges 42 maintaining an essentially fixed geometrical relationship between the stubs 40 which prevents the flexible wires 44 and 44' from being kinked, broken or otherwise damaged during handling prior to assembly of the double wire structure 38 in its intended application such as a high temperature Coriolis mass flow rate instrument.

Figure 2:
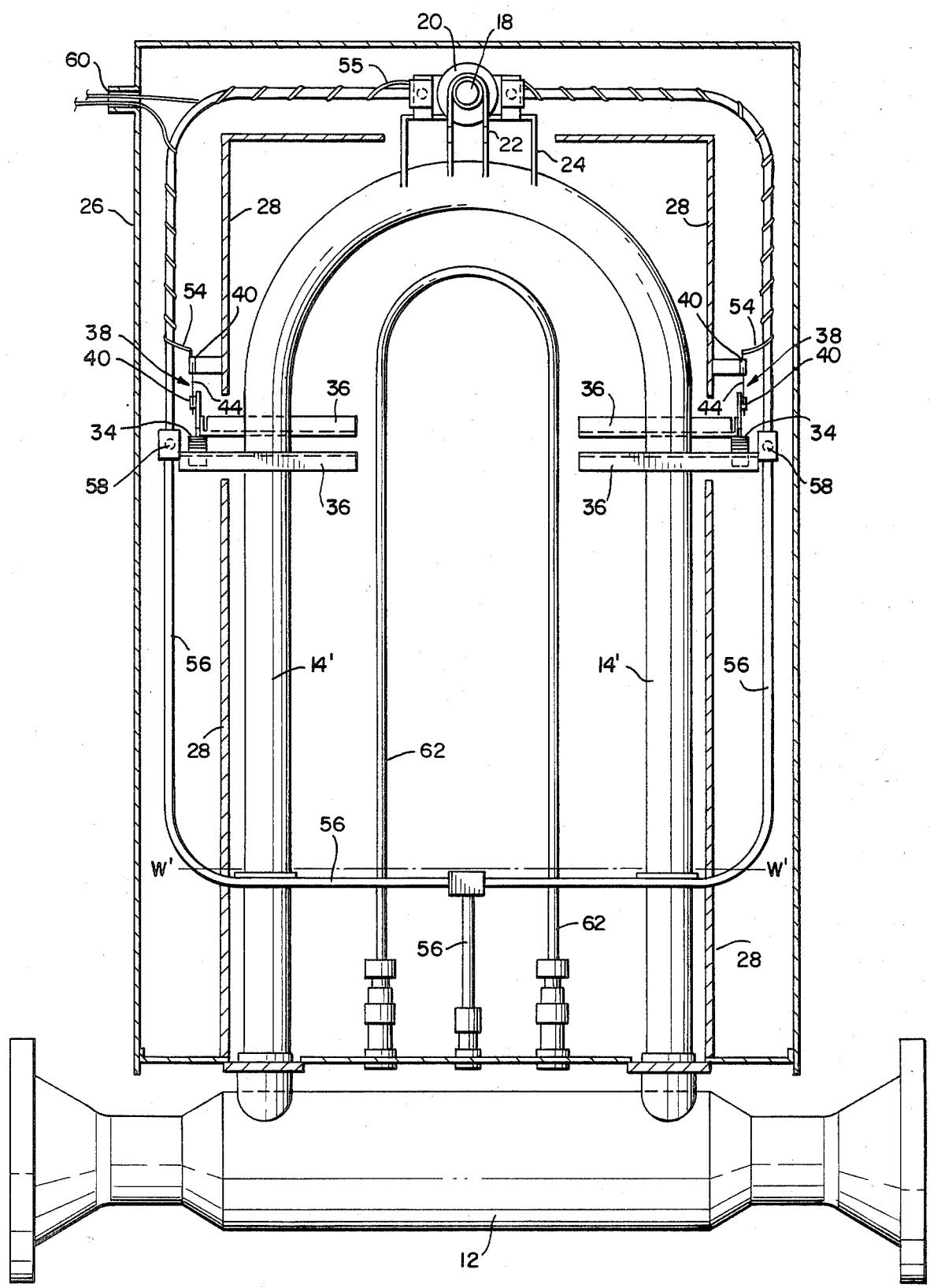
FIG. 2 is a sectional front plan view of a high temperature Coriolis mass flow rate meter according to the present invention.
Figure 3:
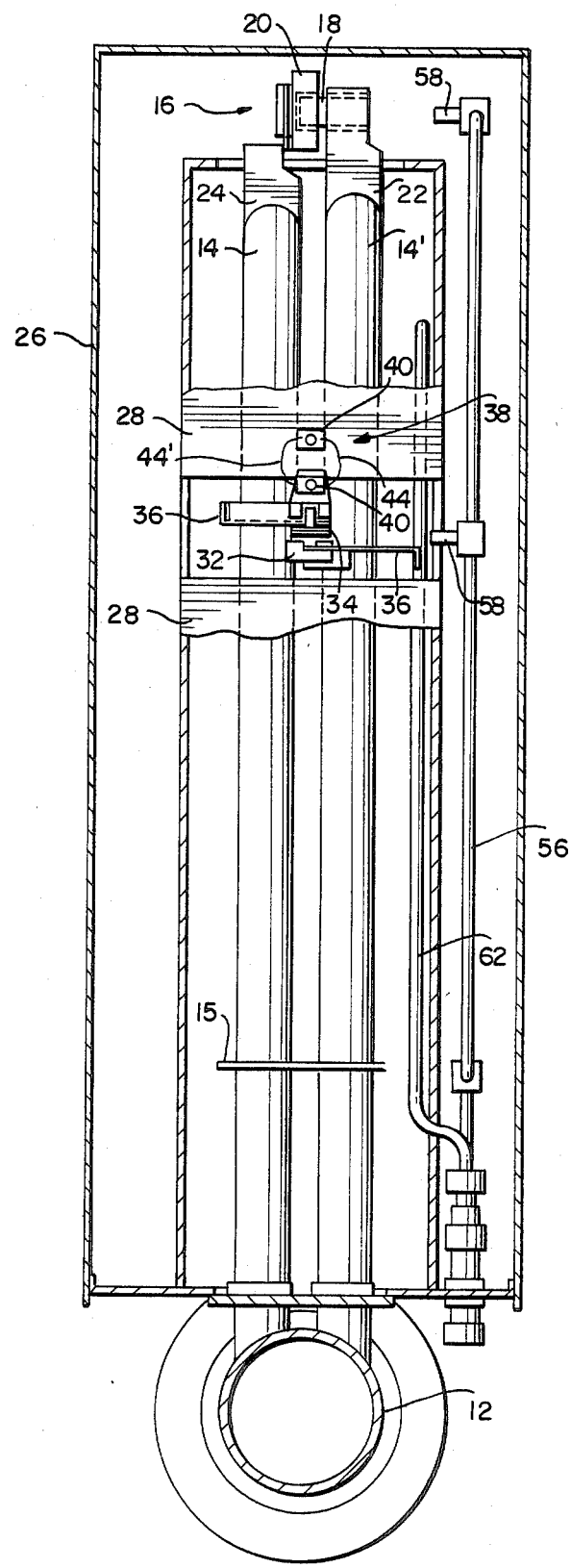
FIG. 3 is a sectional side plan view of a high temperature Coriolis mass flow rate meter according to the present invention.

At each velocity sensor, 30 or 30' of a high temperature Coriolis mass flow rate instrument 10 one of the stubs 40 of a double wire structure 38 is mounted to the suspension bar 36 to which a velocity coil 34 is mounted by a screw or other affixing fastener. The other stub 40 of the double wire structure 38 is affixed to the adjoining partition wall 28. Then the output leads from the coil 34 are soldered to the tabs 46 and 46' adjacent the coil 34 and wires 54 (see FIG. 2) are soldered to the tabs 46 and 46' on the stub 40 mounted to the partition wall 28. With the double wire structure 38 so mounted and electrically connected to the coil 34 the protective bridges 42 are cut near the stubs 40 and removed leaving the flexible wires 44 and 44' as the only physical connection between the stubs 40. These flexible wires 44 and 44' are configured with respect to the coils 34 such that as the coils 34 are moved in response to both the driven oscillations of flow conduits 14 and 14' and the generated Coriolis forces the wires 44 and 44' introduce minimum forces on the coils while providing for electrical transmission of the signals generated in coils 34. The minimization of forces being coupled to the velocity sensor coils, 34 and 34', results not only from the flexibility of the wires, 44 and 44', used for the double wire structure 38, but also from the fact that the semi-circular shape of the wires results in a lower magnitude of deflection for the wires 44 and 44' from their fixed mountings at the partition wall 28 and at the coils 34 and 34' than would result from a rectilinear (or straight line) configuration for wires 44 and 44' between their mounting points.

The double wire structure 38 of the present invention can be used for systems other than flow meters where electrical signals must be transmitted between a first structure moving with respect to a second structure, and where concurrently mechanical forces between the moving structures must be minimized. Examples of systems where double wire structures 38 could be advantageously used include navigation instruments, alignment instruments, chemical analysis instruments (such as spectrometers) etc. This list is not exhaustive only representative of systems other than flow meters where double wire structures 38 can be effectively used because of its capability to transmit electrical signals between structures moving with respect to each other and where damping or drag caused by the wires must be minimized.

In addition to the temperature reduction provided by displacing the velocity sensors 30 and 30' from the flow conduits 14 and 14', compressed gas such as air or nitrogen, is in the preferred embodiment flowed over each of the velocity sensors 30 and 30' and the drive mechanism 16. The compressed gas is in general required to provide additional thermal protection for the velocity sensors 30 and 30' when the fluid temperature is equal or greater than the insulation temperature rating on the wire used to make coils 34 and 34'. The compressed gas is directed to the velocity sensors 30 and 30' and drive mechanism 16 by tubing 56 with vents 58 at each of the velocity sensors 30 and 30' and the drive mechanism 16. The gas which is flowed over the velocity sensors 30 and 30' and drive mechanism 16 is vented from the instrument 10 by passage between the partition wall 28 and from outer case 26 through a port 60. The tubing 56 for the compressed gas is also used to support the wires 54 transmitting the signals from the velocity sensors 30 and 30' and the wires 55 providing the electrical power for drive mechanism 16.

To further minimize thermal transmission from the volume containing flow conduits 14 and 14', insulation, such as silica refractory fiber in blanket form (glass wool) sold under the trademark CERAWOOL, can be positioned between the partition wall 28 and the outer case 26.

For some high temperature applications the temperature of the fluid flowing through the flow conduits 14 and 14' can be maintained, lowered or increased by placing known thermal control elements within the space enclosed by partition wall 28 which can include flow conduits 14 and 14'. For example, tubing 62 can be positioned within the volume containing flow conduits 14 and 14', and steam or other high temperature fluids can be passed through tubing 62 to maintain or increase the temperature of fluids passing through flow conduits 14 and 14'. The thermal contribution of the thermal control elements can be monitored and controlled by such known techniques as thermostats (not shown) positioned adjacent flow conduits 14 and 14'.

The above discussion and related illustrations of the present invention are directed primarily to preferred embodiments and practices of the invention. Numerous changes and modifications in the actual implementation of the concepts described herein will be apparent to those skilled in the art, and it is contemplated that such changes and modifications may be made without departing from the scope of the invention as defined by the following claims.

What is claimed is:

1. An apparatus for measuring the mass flow rate of a high temperature fluid comprising an outer case in which is contained at least one flow conduit through which the fluid to be measured is flowed, said flow conduit solidly mounted to support means in a manner that enables at least a substantial portion of the length of said flow conduit to be oscillated, said apparatus further comprising within said case:
    (A) sensor means for detecting Coriolis force induced distortions of said flow conduit which occur during oscillation, said sensor means being mounted adjacent to but spaced apart from said flow conduit;
    (B) partition wall means for providing thermal insulation mounted adjacent said flow conduit and substantially about its outer periphery, but not in contact with that portion of said flow conduit which is oscillated;
    (C) sensor mounting means for attaching said sensor means to said flow conduit with the sensor means positioned between said partition wall means and said outer case; and
    (D) wire structure means including wires for transmitting signals from the sensor means, said wires attached at a first end of said wire structure means to said sensor means and attached at a second end of said wire structure means to said partition wall, so that the wires of said wire structure means are suspended in non-rectilinear configuration between said first and second ends of said wire structure means.

2. An apparatus as set forth in claim 1 in which a gas conducting means are positioned for providing a flow of gas about said sensor means.

3. An apparatus as set forth in claim 1 in which thermal control means are positioned adjacent said flow conduit.

4. An apparatus as set forth in claim 3 in which said thermal control means includes a fluid conducting pipe through which steam is passed.

5. An apparatus as set forth in claim 1 in which insulating means are positioned between said partition wall means and said outer case.

6. An apparatus as set forth in claim 1 in which drive means are attached to standoff means, with said standoff means attached to said flow conduit at a first end and drive means to oscillate said flow conduit attached at a second end of said standoff means so as to position said drive means between said partition wall means and said outer case.

7. An apparatus as set forth in claim 1 in which a gas conducting means are positioned for providing a flow of gas about said sensor means and said drive means.

* * * * *